Oct. 28, 1952     J. G. QUINN     2,615,332
TORQUEMETER

Filed Dec. 16, 1949     2 SHEETS—SHEET 1

Inventor:
Joseph G. Quinn,
by Paul A. Frank
His Attorney.

Oct. 28, 1952

J. G. QUINN 2,615,332

TORQUEMETER

Filed Dec. 16, 1949

2 SHEETS—SHEET 2

Inventor:
Joseph G. Quinn,
by Paul A. Frank
His Attorney.

UNITED STATES PATENT OFFICE 2,615,332

TORQUEMETER

Joseph G. Quinn, Schenectady, N. Y., assignor to General Electric Company, a corporation of New York Application December 16, 1949, Serial No. 133,356

9 Claims. (Cl. 73—136)

This invention relates to improved torquemeters for measuring the amount of torque transmitted by a rapidly rotating shaft.

A rotating shaft transmitting power undergoes torsional strain proportional to the applied torque. This fact is utilized in many torquemeters in which electric strain gages are connected to the shaft to provide an electrical signal related to the amount of twist between two points along the length of the shaft. Such arrangements, however, often involve the use of slip rings to transmit electrical signals from the shaft, and gage parts which rotate with the shaft and are therefore subject to centrifugal forces. Both of these features become serious disadvantages when the speed of rotation is high.

An object of this invention is to provide an improved torquemeter particularly adapted for use with shafts rotating at high speeds, up to 100,000 R. P. M. for example, which does not have slip rings and in which centrifugal force has minimum effect upon the gage elements. Other objects and advantages will appear as the description proceeds.

According to the present invention, torque is transmitted by a rotating shaft having a hollow portion defining a cavity. Electromagnetic energy is transmitted into this cavity to provide relatively large amplitude oscillations within the cavity at its resonant frequency. A wavemeter, or other suitable means, is provided to indicate relative frequency values of the resonant oscillations. As the shaft twists under applied torque, the dimensions of the cavity are changed slightly, which alters the resonant frequency. These changes in resonant frequency are indicated by the wavemeter and are an indication of the value of applied torque.

Figure 1:
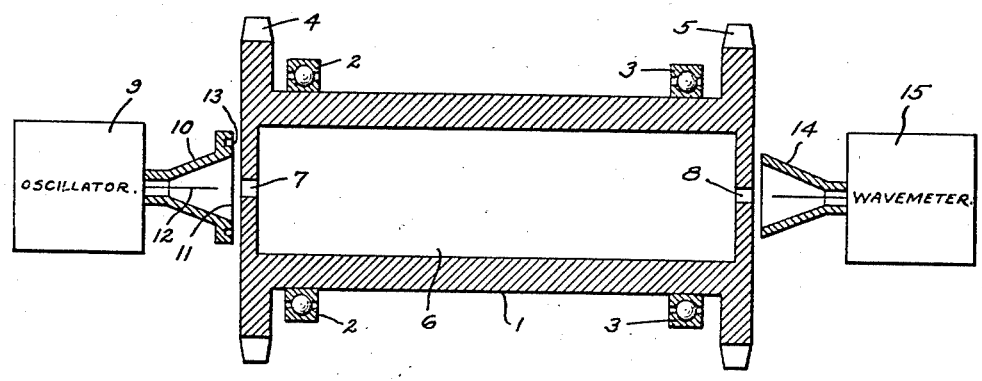
Figure 2:
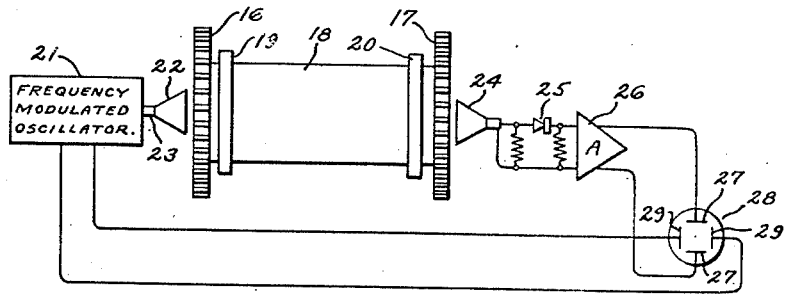
Figure 3:
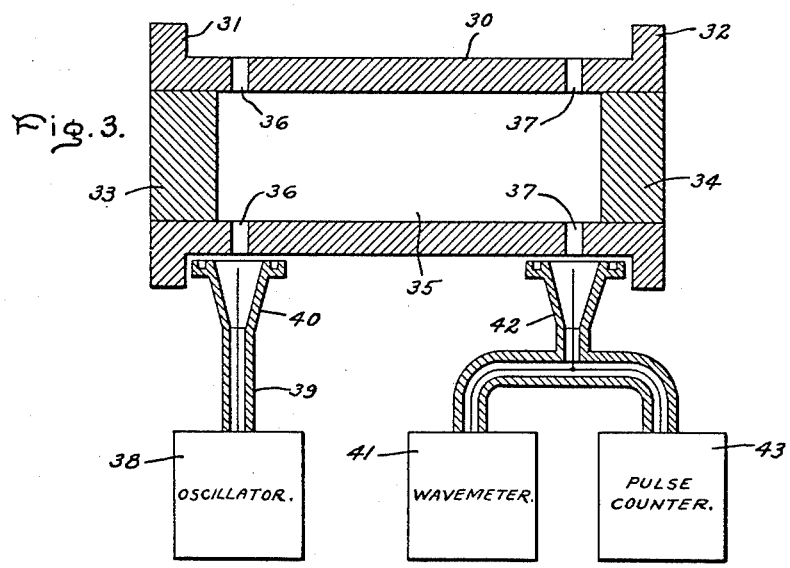
Figure 4:
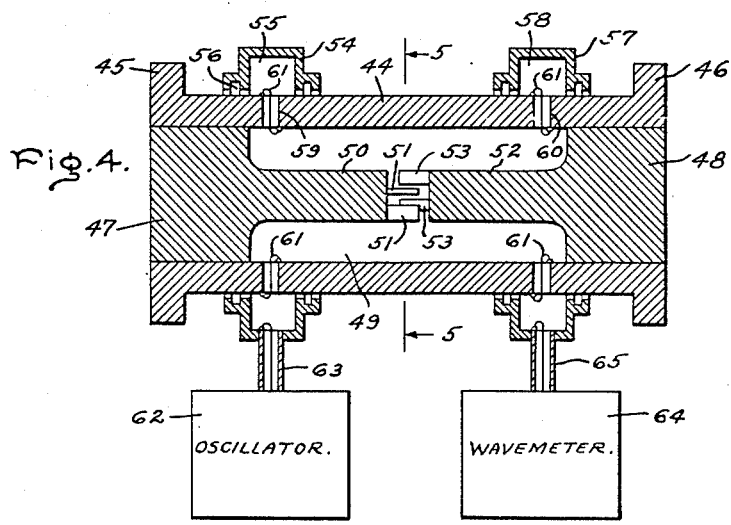
Figure 5:
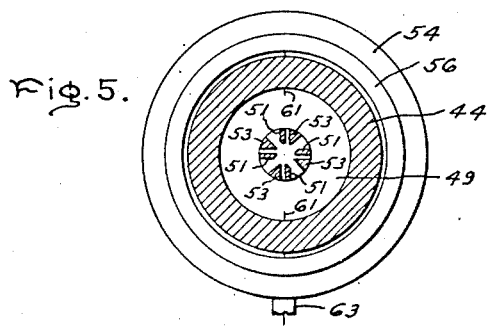

The features of this invention which are believed to be novel and patentable are pointed out in claims which form a part of this specification. For a better understanding of the invention, reference is made in the following description to the accompanying drawings, in which Fig. 1 is a schematic diagram, in section, of my improved torquemeter; Figs. 2–4 are schematic diagrams, in section, of other improved torquemeters embodying my invention; and Fig. 5 is a section in the plane of line 5—5, Fig. 4.

Referring now to Fig. 1, torque to be measured is transmitted through a rotatable shaft 1 supported by bearings 2 and 3. Torque is applied to the shaft by gears 4 and 5 attached to respective ends of the shaft. For example, gear 4 may be connected through other gears to a turbine or other prime mover, and gear 5 may be connected through other gears to a load such as a propeller.

Shaft 1 has a hollow portion defining a cavity 6. At respective ends of this cavity, there are small openings 7 and 8. When torque is applied to shaft 1, the shaft twists slightly, thereby producing a slight change in the dimensions of cavity 6, especially the lengthwise dimension. This change in dimension alters the resonant frequency of the cavity.

An oscillator 9 supplies electromagnetic oscillations to a coupling member 10 which has an open end 11 adjacent opening 7. Coupling member 10 may be connected to oscillator 9 through a waveguide or through a coaxial connector having an inner conductor 12 as shown. Since coupling member 10 remains stationary while shaft 1 rotates, there is a small space between the coupling member and the end of the shaft. To prevent the excessive loss of magnetic energy through this space, the edge of member 10 is provided with a choke 13 as shown.

A second coupling member 14 is provided at the other end of shaft 1 adjacent opening 8. Member 14 is connected to a wavemeter 15.

In the operation of this torquemeter, both oscillator 9 and wavemeter 15 may be tuned for maximum amplitude of oscillations within cavity 6. The frequency of these oscillations as indicated by the wavemeter is the resonant frequency of the cavity. Since this resonant frequency changes with changes in cavity dimensions, and since these dimensions change when the shaft is twisted by the application of torque, a calibration can be established between frequency indications and values of transmitted torque. When such a calibration has been made, wavemeter 15 may be fitted with a scale to indicate the relative frequency values directly in units of torque transmitted.

It should be noted that, in this torquemeter, shaft 1 is the only rotating part. Since this shaft is symmetrical about the axis of rotation, and since it may be very strong and rugged, the effects of centrifugal force are minimized. Since the resonant frequency of the cavity is less dependent upon radial dimensions than upon longitudinal dimensions, dimensional changes due to centrifugal forces have little effect upon the torque indications. Also, there are no slip rings. The electromagnetic oscillations are transmitted into the cavity through hole 7 and out through hole 8. Coupling members 10 and 14, which are respectively adjacent holes 7 and 8, are stationary and are not in mechanical contact with the rotating shaft.

A preferred method of operating the torquemeter, which simplifies the tuning, is to use a frequency modulated oscillator at 9 which provides oscillations at all frequencies within a frequency band including the resonant frequency of cavity 1. For example, oscillator 9 may be variable in frequency to provide oscillations covering the band of frequencies between 800 and 1000 megacycles per second. The exact frequency band to be used depends upon the cavity dimensions. Relatively large amplitude oscillations are provided within cavity 6 each time the oscillator frequency coincides with the resonant frequency of the cavity. These relatively large amplitude resonant frequency oscillations are transmitted through opening 8 to wavemeter 15, which thereupon indicates the relative value of the resonant frequency, and thereby indicates the value of the transmitted torque.

A convenient form of the improved torquemeter is illustrated in Fig. 2. Torque is applied through gears 16 and 17 to a hollow rotatable shaft 18 supported upon bearings 19 and 20. A frequency modulated oscillator 21 supplies electromagnetic energy to a cavity within shaft 18 through coupling member 22 and connector 23, thereby providing within the cavity relatively large amplitude electromagnetic oscillations at the resonant frequency. A portion of this resonant frequency energy is transmitted to coupling member 24, rectified by rectifying means 25, amplified by amplifier 26, and applied to the vertical deflection plates 27 of a cathode ray oscillograph tube 28. Each time the frequency of oscillations supplied by oscillator 21 coincides with the resonant frequency of the cavity within shaft 18, relatively large amplitude oscillations are transmitted to coupling member 24, which produces a vertical deflection of the cathode ray oscillograph tube electron beam. Oscillator 21 also provides an electric signal which is related to the frequency of the electromagnetic oscillations supplied. This signal is applied to horizontal deflection plates 29 of the oscillograph tube. As a result, the trace on the face of the oscillograph tube is a horizontal line having a vertical "pip," the position of which along the horizontal axis indicates the resonant frequency of the cavity and hence the value of torque transmitted by shaft 18.

It is not necessary that the openings through which electromagnetic energy is transmitted be at the ends of the cavity. They may be placed along the sides as shown in Fig. 3. Referring to this figure, torque is applied to a hollow shaft 30 through couplings 31 and 32 at respective ends of the shaft. Plugs 33 and 34 close the ends of the shaft so that the hollow shaft defines a cavity 35, the dimensions of which are altered by twisting of the shaft upon the application of torque thereto. Shaft 30 has a plurality of transverse openings 36 and 37 through which electromagnetic coupling with the cavity is effected. An oscillator 38 is electromagnetically coupled to the cavity through connector 39, coupling member 40, and holes 36. A wavemeter 41 is coupled to the cavity through coupling member 42 and holes 37. Operation is essentially the same as in the apparatus previously described, except that coupling with the cavity is obtained only when the openings in the shaft wall are aligned with the coupling members. However, since the frequency of the electromagnetic oscillations is very high compared to the rotational speed of shaft 30, satisfactory operation can be obtained despite the intermittent nature of the coupling.

With this arrangement, oscillations reach coupling member 42 in a series of pulses, the repetition rate of which depends upon the speed of rotation of shaft 30. Therefore, the speed of rotation of the shaft may be indicated by a pulse counter 43 connected to coupling member 42. Pulse counter 43 may be of any device of a type which indicates the number of pulses received during a predetermined time interval or the rate of arrival of pulses. Since this apparatus indicates both speed of rotation and the value of torque transmitted, it provides all information necessary for determining transmitted power.

Refer now to Figs. 4 and 5, which illustrate a torquemeter having very high sensitivity. Torque is applied to a hollow shaft 44 through coupling members 45 and 46. Plugs 47 and 48 close respective ends of the hollow shaft so that the shaft defines a cavity 49. Attached to plug 47 and coaxial with shaft 44 is a rod 50 having at its end small metal fingers 51. Attached to plug 48 is a rod 52 having fingers 53 which interleave with fingers 51. Each of the fingers 51 is close to an adjacent finger 53, as illustrated in Fig. 5. As torque is applied and the shaft is twisted, the dimension between each finger 51 and the adjacent finger 53 changes. This alters the capacitance between the fingers and produces a relatively large change in the resonant frequency of the cavity for a very small amount of twisting in shaft 4, thus providing a very high sensitivity for the torquemeter.

An annular coupling member 54, having a U-shaped cross section as shown, defines three walls of an annular waveguide 55 around the outside of shaft 44. The shaft itself defines the fourth wall of the waveguide. Coupling member 54 is stationary and is slightly separated from shaft 44 to permit free rotation of the shaft. The edges of member 54 may be provided with a choke 56, as shown, to prevent excessive loss of electromagnetic energy. A similar coupling member 57 defines three walls of a second annular waveguide 58 around shaft 44 near the other end of cavity 49, as shown. Waveguides 55 and 58 are designed to have a flat frequency characteristic over the band of wavelengths to be employed in the torquemeter so that the amplitude of oscillations transmitted is substantially affected only by the resonant frequency of cavity 49.

Coupling between cavity 49 and waveguide 55 is provided by transverse openings 59 extending through the wall of shaft 44. Similar openings 60 provide coupling between cavity 49 and waveguide 58. To increase the degree of coupling, a wire 61 may be provided through the center of each opening and looped at each of its ends to form a magnetic probe.

Oscillator 62 supplies electromagnetic oscillations to waveguide 55 through coaxial connector 63. These oscillations are tuned to the resonant frequency of cavity 49, or they are frequency modulated over a frequency band including the resonant frequency, to provide relatively large amplitude resonant frequency oscillations within the cavity. These oscillations are transmitted through opening 60 to waveguide 58, and their frequency is measured by wavemeter 64 which is coupled to waveguide 58 through coaxial connector 65.

Having described the principle of this invention and the best mode in which I have contemplated applying that principle, I wish it to be understood that the examples described are illustrative only, and that other means may be employed without departing from the true scope of the invention.

What I claim as new and desire to secure by Letters Patent of the United States is:

1. A torquemeter comprising a hollow shaft defining a cavity, means for applying to said shaft a torque to be measured, whereby such torque twists the shaft and alters the dimensions of said cavity, means for coupling to said cavity electromagnetic oscillations variable in frequency over a band of frequencies, and means for determining the frequency at which said cavity resonates.

2. A torquemeter comprising a shaft adapted to transmit torque, said shaft having a hollow portion defining a cavity, means including an oscillator electromagnetically coupled to said cavity for supplying thereto electromagnetic oscillations variable in frequency over a band of frequencies, and frequency responsive means electromagnetically coupled to said cavity for indicating the frequency at which said cavity resonates.

3. A torquemeter comprising a shaft having a hollow portion defining a cavity, means for applying a torque to be measured to said shaft, whereby such torque twists the shaft and alters the dimensions of the cavity, means including an oscillator electromagnetically coupled to said cavity for supplying thereto electromagnetic oscillations having a frequency band including the resonant frequency of the cavity, whereby relatively large resonant frequency oscillations are produced within the cavity, and frequency responsive means electromagnetically coupled to said cavity for indicating the frequency at which the cavity resonates.

4. A torquemeter comprising a shaft having a hollow portion defining a cavity, means for applying torque to be measured to said shaft, whereby such torque twists the shaft and alters the dimensions of the cavity, a frequency modulated oscillator electromagnetically coupled to said cavity for supplying thereto electromagnetic oscillations having a frequency band including the resonant frequency of the cavity, whereby relatively large resonant frequency oscillations are produced within the cavity, and a wavemeter electromagnetically coupled to said cavity for measuring the value of the frequency at which said cavity is resonant.

5. A torquemeter comprising a shaft having a hollow portion defining a cavity, means for applying the torque to be measured to said shaft, whereby such torque twists the shaft and alters the dimensions of the cavity, a frequency modulated oscillator electromagnetically coupled to said cavity for supplying thereto electromagnetic oscillations having a frequency band including the resonant frequency of the cavity, a cathode ray oscillograph having horizontal and vertical deflection means, means electromagnetically coupled to said cavity for providing electric signals related to the amplitude of oscillations within the cavity and applying such signals to one deflection means of said oscillograph, and means for providing electric signals related to the frequency of oscillations supplied by said oscillator and applying such signals to the other deflection means of said oscillograph.

6. A torquemeter comprising a shaft having a hollow portion defining a cavity, means for applying the torque to be measured to said shaft, whereby such torque twists the shaft and alters the dimensions of the cavity, said shaft having a plurality of transverse openings through the wall of said cavity, means including a frequency modulated oscillator for supplying electromagnetic oscillations to said cavity through such openings, such oscillations having a frequency band including the resonant frequency of the cavity, whereby relatively large resonant frequency oscillations are produced within the cavity, and frequency responsive means electromagnetically coupled to said cavity through said openings for indicating the frequency at which said cavity resonates.

7. In combination, a rotatable shaft having a hollow portion defining a cavity, means for rotating said shaft and applying torque thereto to transmit power through the shaft, whereby such torque twists the shaft and alters the dimensions of the cavity, means providing to said cavity electromagnetic oscillations variable in frequency over a band of frequencies, said shaft having a plurality of openings through the wall of said cavity through which a portion of the electromagnetic oscillations are transmitted, frequency responsive means electromagnetically coupled to said cavity through said openings for indicating the frequency at which said cavity is resonant, and pulse-counting means intermittently coupled to said cavity at predetermined positions of said openings.

8. A torquemeter comprising a hollow shaft defining a cavity, means for applying to said shaft the torque to be measured, whereby the shaft is twisted, interleaved fingers within said cavity connected to opposite ends thereof so that twisting of the cavity alters the dimension between adjacent fingers, thus changing the resonant frequency of the cavity, means to provide within said cavity electromagnetic oscillations variable in frequency over a band of frequencies, and means for indicating the value of the frequency of such oscillations at which said cavity resonates.

9. A torquemeter comprising a rotatable shaft having a hollow portion defining a cavity, means for applying the torque to be measured to said shaft, whereby such torque twists the shaft and alters the dimensions of the cavity, stationary walls defining three sides of a plurality of annular waveguides around the outside of said shaft, the shaft defining the fourth side of said waveguides, means electromagnetically coupling said cavity and said annular waveguides, means for supplying to one of said waveguides electromagnetic oscillations variable in frequency over a band of frequencies, and means coupled to another of said waveguides for indicating the frequency of oscillations at which said cavity resonates.

JOSEPH G. QUINN.

REFERENCES CITED

The following references are of record in the file of this patent:

UNITED STATES PATENTS

| Number | Name | Date |
| --- | --- | --- |
| 2,421,933 | Goldstine | June 10, 1947 |
| 2,491,418 | Schlesman | Dec. 13, 1949 |